United States Patent [19]
Bulteau

[11] Patent Number: 5,187,989
[45] Date of Patent: Feb. 23, 1993

[54] APPARATUS FOR DETECTING ROTATION OF A ROTARY ELEMENT SUCH AS THE SPINNER OF A WATER METER

[75] Inventor: Serge Bulteau, Charnay-les-Macon, France

[73] Assignee: Schlumberger Industries, Montrouge, France

[21] Appl. No.: 731,684

[22] Filed: Jul. 17, 1991

[30] Foreign Application Priority Data

Jul. 20, 1990 [FR] France .................. 90 09277

[51] Int. Cl.⁵ ............................. G01F 1/10
[52] U.S. Cl. ................. 73/861.78; 324/166; 364/550; 364/565
[58] Field of Search .............. 73/861.77, 861.78; 324/166, 207.25; 364/510, 550, 565

[56] References Cited

U.S. PATENT DOCUMENTS

| | | | |
|---|---|---|---|
| 4,399,709 | 8/1983 | Diepold-Scharnitzky | 73/861.77 |
| 4,537,081 | 8/1985 | Max | 73/861.77 |
| 4,565,090 | 1/1986 | Gotanda | 73/861.77 |

FOREIGN PATENT DOCUMENTS

| | | |
|---|---|---|
| 370174 | 5/1990 | European Pat. Off. . |
| 3608191 | 11/1986 | Fed. Rep. of Germany . |
| 2271620 | 12/1975 | France . |
| 2067295 | 7/1981 | United Kingdom . |

OTHER PUBLICATIONS vol. 7, No. 274 "Patent Abstracts" of Japan.

Primary Examiner—Herbert Goldstein
Attorney, Agent, or Firm—Dale V. Gaudier

[57] ABSTRACT

The rotation detecting device comprises m proximity detectors for detecting the passage of a mark fixed to a rotary element. Changes in the signals delivered by each of the detectors in a selected series of m-1 detectors are analyzed. Once a mark is detected at one of the sectors situated at an end of the series, a revolution counting index is incremented, a new series of m-1 detectors is selected excluding the detector which has just detected the passage of the mark, and criteria representative of changes in the signals are reinitialized for the forthcoming signals from the newly-selected series. An adaptive system is thus obtained applicable to detecting the rotation of a spinner in a water meter.

11 Claims, 6 Drawing Sheets

POSITIVE ROTATION          NEGATIVE ROTATION

FIG. 7

APPARATUS FOR DETECTING ROTATION OF A ROTARY ELEMENT SUCH AS THE SPINNER OF A WATER METER

The invention relates to apparatus for detecting rotation a rotary element such as the spinner of a water meter, and more particularly a water meter integrated in a calorimeter for metering the energy delivered by a hot water circuit.

BACKGROUND OF THE INVENTION

Conventionally most water meters include a totalizing counter which is driven mechanically, i.e. rotation of the spinner drives the index wheels of the meter via a transmission which is mechanical and/or magnetic.

More recently, proposals have been made to detect rotation of the spinner by means of a proximity sensor placed facing a rotary element integral with the spinner and designed to detect the passage of a mark placed eccentrically on the rotary element. For example, the proximity detector may be based on an inductive method, in which case the mark is constituted by a material whose magnetic and/or electrical characteristics are different from the remainder of the rotary element. Such detectors nevertheless suffer from drawbacks.

Firstly there are various parameters that vary as a function of time; for example for a water meter integrated in a calorimeter, these parameters include: the temperature of the water that may cause the characteristics of the detector to vary; the power supply voltage to the detector circuit, in particular when the power supply is provided by a battery; and the distance between the proximity detector and the rotary element because of the way the spinner rises at high speed.

In general, there are various parameters that vary from one detector to another and that are difficult and expensive to bring under control in mass production. For example, for an inductive type of detector, such parameters include the inductance of the coil and its Q-factor, which means that each detector needs to be calibrated or else that components need to be sorted.

An object of the invention is to remedy these drawbacks by using a system that is adaptive and includes at least two proximity detectors.

SUMMARY OF THE INVENTION

The present invention provides a device for detecting the rotation of a rotary element about an axis XX', the device comprising:

a) m proximity detectors situated in a plane perpendicular to the axis XX' on m radial directions;

b) a mark fixed to said element eccentrically relative to the axis XX', said mark being suitable for modifying the response of the proximity detectors when said element is rotating;

c) a power supply for powering said proximity detectors;

d) selection means for selecting a series of m−1 proximity detectors to be powered; and e) processor means firstly for observing changes in the signals delivered by each of the detectors in said series using parameters representative of such changes, thereby identifying the passage of the mark past one of the detectors situated at the end of said series, and secondly, as soon as such a passage has been identified, for:

deducing therefrom the number of revolutions;

actuating the selection means so as to cause it to select a new series of m−1 proximity detectors excluding the detector at which passage of the mark has just been identified; and reinitializing said parameters in readiness for observing changes in the forthcoming signals from said new series in such a manner that the parameters reinitialized in this manner are representative of the fact that, at that time, the mark cannot be at one of the detectors of said new series.

Advantageously, the rotary element is made of non-metallic material; the mark is constituted by a metalized portion of said rotary element; each proximity detector is constituted by an oscillator circuit including a coil and a capacitor; and the power supply means comprise a pulse generator feeding each detector in said selected series in succession, with pulses of about 3 V at a frequency lying in the range 400 Hz to 800 Hz.

In a first embodiment for which m=2, the processor means comprise:

for each signal delivered, means for counting the number N of periods in the signal exceeding a predetermined threshold value Vthreshold;

for each value N obtained in this way, means for comparing N with two parameters Nmax and Nthreshold representative of the said changes and for calculating two new values of said parameters, said values of said parameters concerning said changes being calculated as follows:

if N>Nmax
  Nmax=N
  Nthreshold=f(Nmax) with f being a linear function of Nmax and with Nthreshold<Nmax
if Nthreshold<N<Nmax
  Nmax=Nmax
  Nthreshold=Nthreshold
if N<Nthreshold
  Nmax=0
  Nthreshold=0 and means for generating said control signal for actuating said selection means and for incrementing an index used for counting the number of revolutions when N is less than Nthreshold.

In a second embodiment, m=3, i.e. the device includes three detectors, in which case processing is applied to the signals delivered by two detectors Le=Lp or Ln. In this second embodiment, the processor means comprise:

for each signal delivered by a detector Le, means for counting the number N of periods that exceed a predetermined threshold voltage Vthreshold;

for each value N obtained in this way, means for comparing N with a parameter Nmax(Le) representative of changes in the signals delivered by the detector Le, and with a fixed parameter Nthreshold which is valid for all three detectors, and for calculating new values of said parameters as follows:

if N>Nmax
  Nmax(Le)=N
if Nmax(Le)−Nthreshold<N<Nmax(Le)
  Nmax(Le)=Nmax(Le)
if N<Nmax(Le)−Nthreshold
  Nmax(Lp)=0 and Nmax(Ln)=0 when N<Nmax(Le)−Nthreshold, means for applying a signal IP or IN to the counter circuits as a function of whether the detector Le=Lp or Ln, the signals IP and IN being respectively representative of one-third of a revolution in the positive direction of rotation and in the negative direction of rotation, and for selecting two new detectors, excluding the detector at which the mark was detected.

Preferably, the processor means also include:

means for ensuring that each detector is operating properly by comparing the number N with a value Nmin; and if one of the detectors should break down, means enabling the device to continue to operate using the other two detectors.

A particularly advantageous application of the invention lies in water metering.

BRIEF DESCRIPTION OF THE DRAWINGS

Embodiments of the invention are described by way of example with reference to the accompanying drawings, in which.

DETAILED DESCRIPTION

Figure 1:
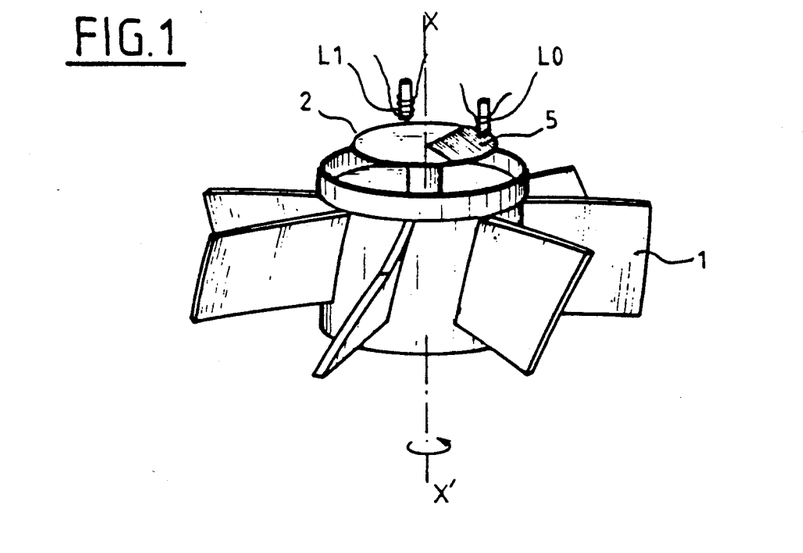
FIG. 1 shows a first embodiment of the invention using two detectors.

FIG. 1 shows a first embodiment of the invention in which the rotary assembly is constituted, for example, by the spinner 1 of a flow meter (not shown) and by a disk 2 which is integral with the spinner 1. While a fluid such as water is flowing, the spinner 1 and the disk 2 rotate about an axis XX'. The speed of rotation of the rotary element is directly related to the instantaneous flow rate of the fluid.

Two proximity detectors L0 and L1 situated in a plane P perpendicular to the axis XX' and at two different radial directions relative to the axis XX' respond to the proximity of a mark 5 integral with the disk 2 and disposed eccentrically relative to the axis of rotation XX'. It follows that when the rotary element (spinner 1 and disk 2) is rotated, the response of the proximity detectors L0 and L1 changes as a function of the position of the mark 5.

By way of illustration, the two proximity detectors L0 and L1 are magnetic coils 3a and 4a coupled in parallel with capacitors 3b and 4b, thereby forming two oscillator circuits disposed on two opposite radial directions. The disk 2 is made of non-metallic material, e.g. molded plastic, and the mark 5 is a metallized radial sector on the disk.

Figure 2:
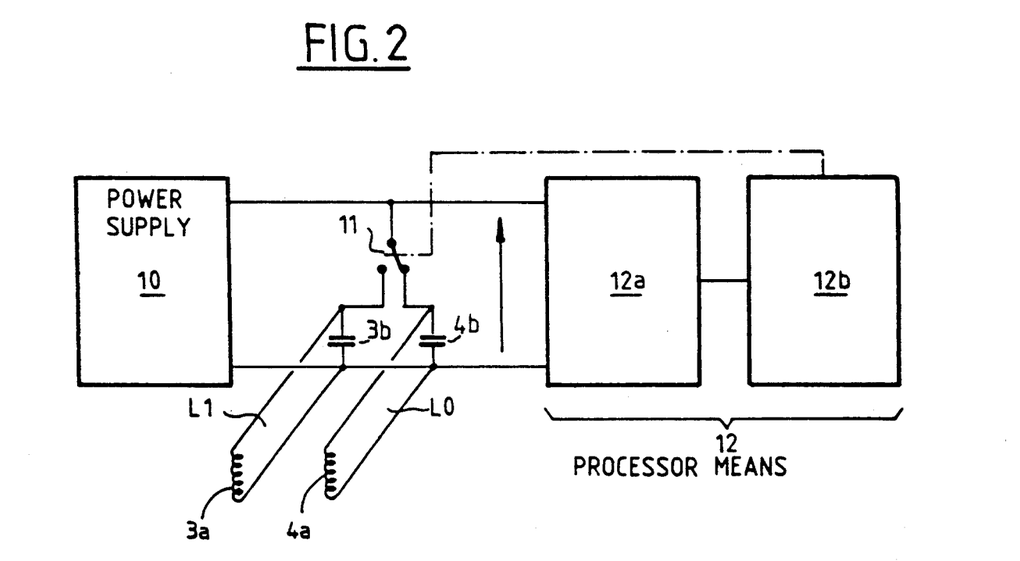
FIG. 2 is a diagram of the circuits associated with the two proximity detectors of FIG. 1.

FIG. 2 shows the architecture of the circuits associated with the proximity detectors L0 and L1. A power supply 10, e.g. a battery, applies the energy required to excite one or other of the two proximity detectors L0 and L1 via a switch 11.

Processor means 12 connected via the switch 11 serve to analyze the signals delivered by the excited proximity detector so as to identify passage of the mark 5 close to the active proximity detector.

The passage of the mark 5 past the active detector is identified by analyzing changes in the signals delivered in succession by the active proximity detector, e.g. by comparing the signal as delivered with parameters representative of said changes and calculated on the basis of the preceding signal(s).

Once the processor means 12 have identified the passage of the mark close to one of the proximity detectors, they trigger the following stages:

they deliver a control signal to actuate the switch 11 so as to select the other proximity detector;

they deliver a rotation signal representative of the rotary element performing a half turn and used for controlling a counter circuit that stores the number of turns performed by the rotary element; and they reinitialize the analysis parameters for use with the following signal coming from the newly-connected other proximity detector, thereby ensuring that the reinitialized parameters are representative of the mark not being in the vicinity of the newly-connected detector; the reinitialized parameters are thus independent of the distance between the detector and the rotary element.

It is thus possible to track the approach of the mark towards the newly-connected detector by tracking changes in the signal delivered by the detector until an indication is obtained without any possibility of doubt that the mark is beneath the detector in question.

An adaptive tracking system is thus obtained which does not require a previously fixed detection threshold. The system also takes account of the differences that exist between the two proximity sensors without it being necessary to calibrate both of the sensors and to store calibration coefficients in memory for the purpose of analyzing the signals. As mentioned above, such calibration coefficients vary not only from one detector to another, but also as a function of time, as a function of temperature, as a function of power supply voltage, and as a function of the distance between each of the detectors and the rotary element.

In addition, because only one or other of the detectors is excited in alternation, energy saving is obtained which is particularly advantageous when the system is battery powered and when the lifetime of the battery is to be several years.

Figure 4:
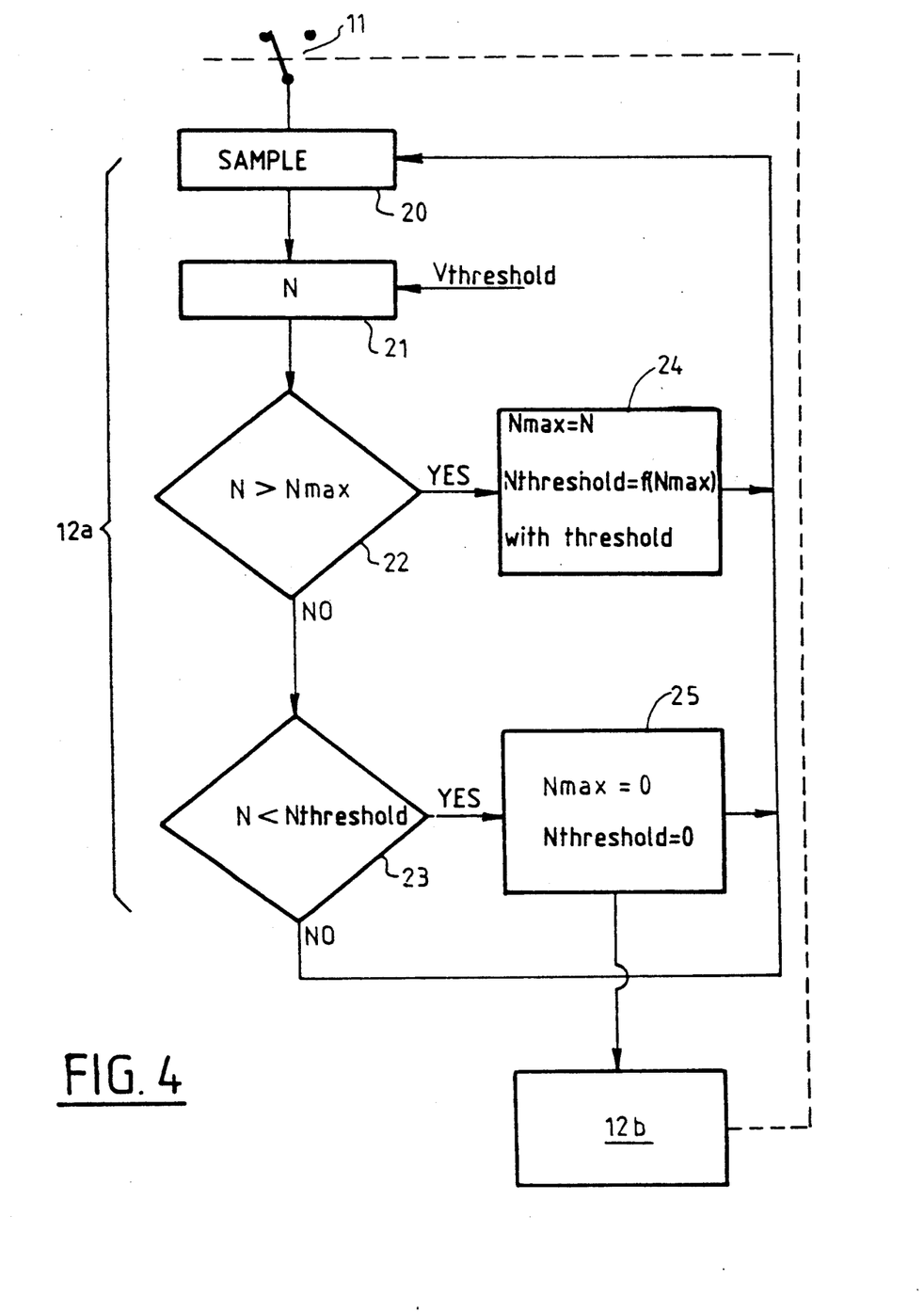
FIG. 4 is a flow chart showing the way in which signals are processed in the first embodiment of the invention.

Returning to the illustrative example mentioned above, there follows a description with reference to FIG. 4 of one possible way of processing the signals delivered by the oscillator circuits L1 and L2. Naturally, the person skilled in the art will be aware of other ways in which these signals may be examined.

Figure 3:
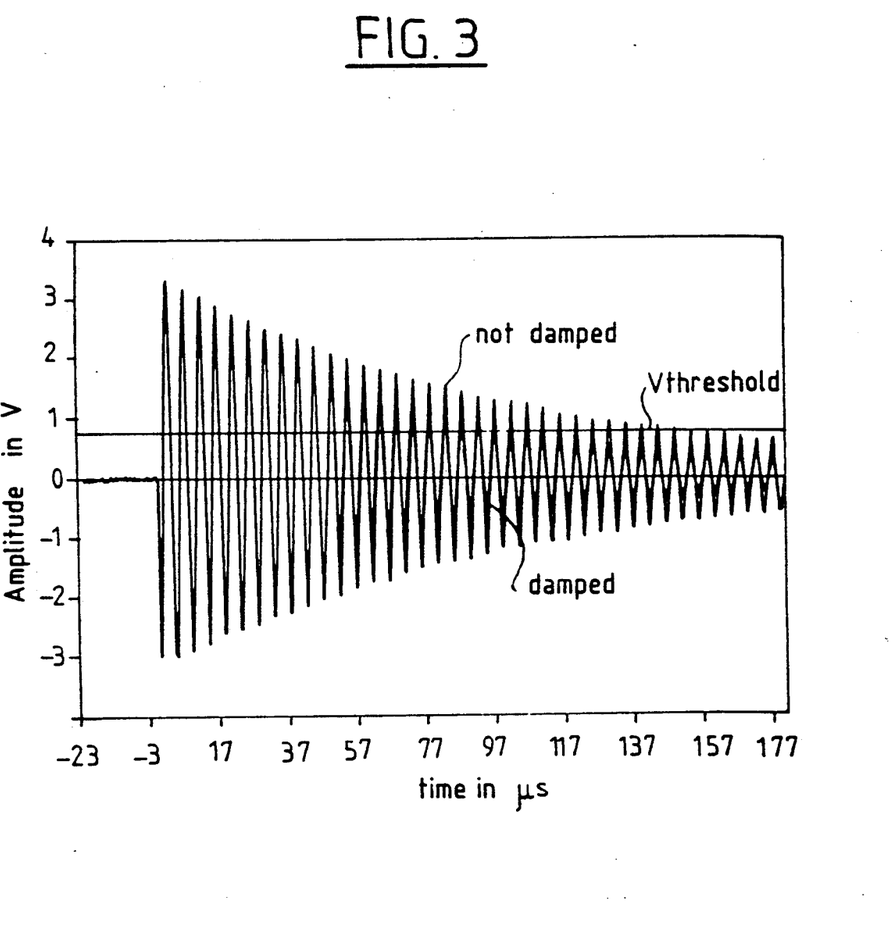
FIG. 3 shows the signals obtained using inductive type proximity detectors.

As shown in FIG. 3, the signal delivered by the oscillator circuit is damped to a greater or lesser extent as a function of the position of the mark 5: when the metallized sector 5 is level with the magnetic coil, then the signal is strongly damped whereas when the metallized sector is remote therefrom, then the signal is weakly damped.

To evaluate the damping on the signal delivered by an oscillator circuit L1 or L2, the oscillator circuit in question is excited using pulses of about 3 V that are delivered by the power supply 10 operating at a sampling frequency of about 400 Hz. This method of operation by sampling provides considerable savings with respect to battery consumption in comparison with operating in continuous mode.

The signal delivered (block 20) is sampled and the number of periods N in the signal exceeding a voltage threshold Vthreshold is counted (block 21), with Vthreshold being taken from the power supply 10. For each value of N obtained in this way parameters Nmax and Nthreshold are calculated on the basis of the value N and on the basis of the preceding parameters Nmax and Nthreshold calculated during the preceding cycle, as follows:

a) if N>Nmax (block 22)
then Nmax=N
Nthreshold=f(Nmax) where Nthreshold<Nmax (block 24), and where the function f is a linear function in which the coefficients are determined on the basis of minimum and maximum numbers of periods exceeding the threshold voltage when the signal is strongly damped and when the signal is weakly damped; for example, Nthreshold could be selected to be equal to nNmax with 0<n<1, or Nthreshold could be selected to be equal to Nmax−b where b is a constant, and then the following sample from the same oscillator circuit is waited for;

b) if Nthreshold<N<Nmax (blocks 22 and 23) then the parameters are not changed and the following sample from the same oscillator circuit is waited for; and c) if N<Nthreshold (block 23), i.e. if it is certain that the mark is beneath the coil, then the parameters are reinitialized, e.g. by being reset to zero:
Nmax=0 and Nthreshold=0 (block 25)
in which case the processor means (12a) deliver a rotation signal which increments the counter circuit (12b) by one half-turn, and the counter circuit in turn delivers a control signal to actuate the switch 11 and thus select the other oscillator circuit prior to the arrival of the following sample.

The embodiment described above can naturally be transposed to any other type of proximity sensor, e.g. to a sensor of the capacitive type or of the optical type.

Figure 5:
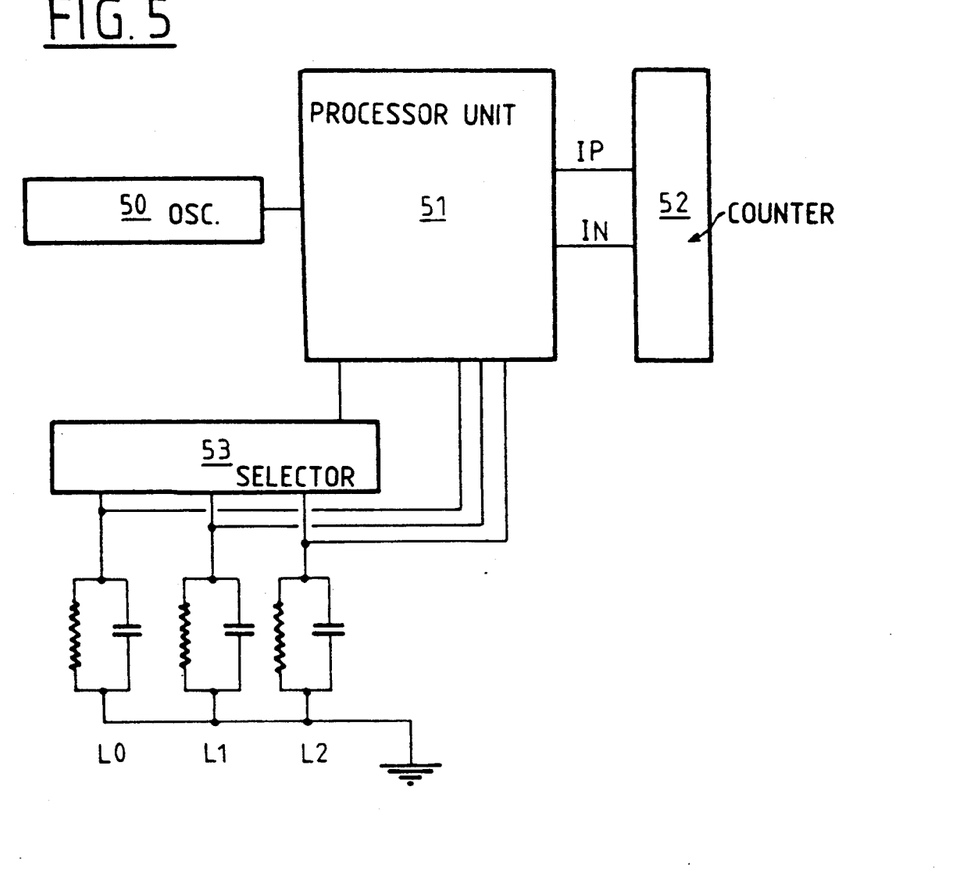
FIGS. 5 and 6 show a second embodiment of the invention including three proximity detectors and enabling direction of rotation to be detected.

In addition, it may be generalized to a device comprising m proximity detectors, which generalization is now illustrated by means of a second embodiment as shown in FIG. 5 in which the rotation detection device comprises three inductive type proximity detectors L0, L1, and L2 disposed on three radial directions at 120° intervals, i.e. m=3.

An oscillator 50 controls a processor unit 51 for processing the signals delivered by the detectors L0, L1, and L2, and controls the sequences in which the detectors are selected via a selector circuit 53. Two outputs from the processor unit 51 respectively marked IP for rotation signals in positive direction and IN for rotation signals in the negative direction provide the electronic counter circuits 52 with the information required to count rotations. In a particularly advantageous embodiment, all of the circuits 50 to 53 may be implemented in the form of integrated circuit technology.

Figure 6:
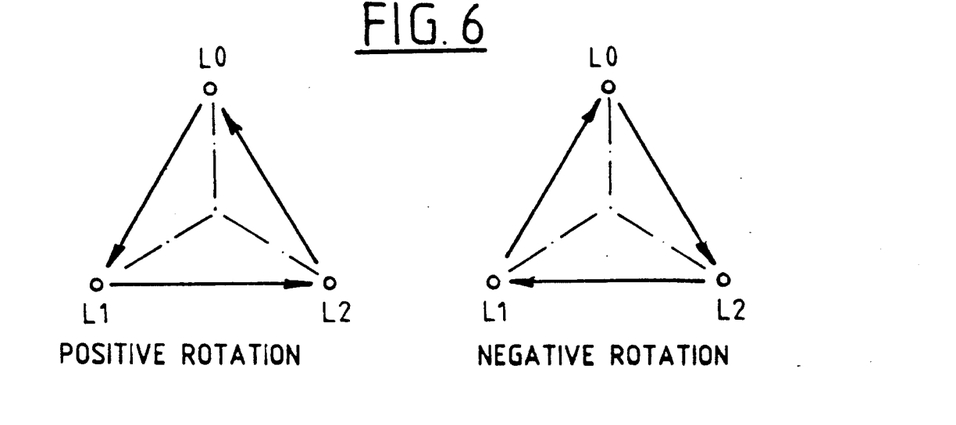

Such a device has several advantages over a two-detector device as described above: in particular it enables the direction of spinner rotation to be determined (cf. FIG. 6) and to keep count separately or cumulatively of revolutions in the positive direction and in the negative direction; in addition it provides the device with redundancy in that if any one of the detectors breaks down, then the device can continue to operate on the other two detectors, albeit without being able to detect direction of rotation.

Figure 7:
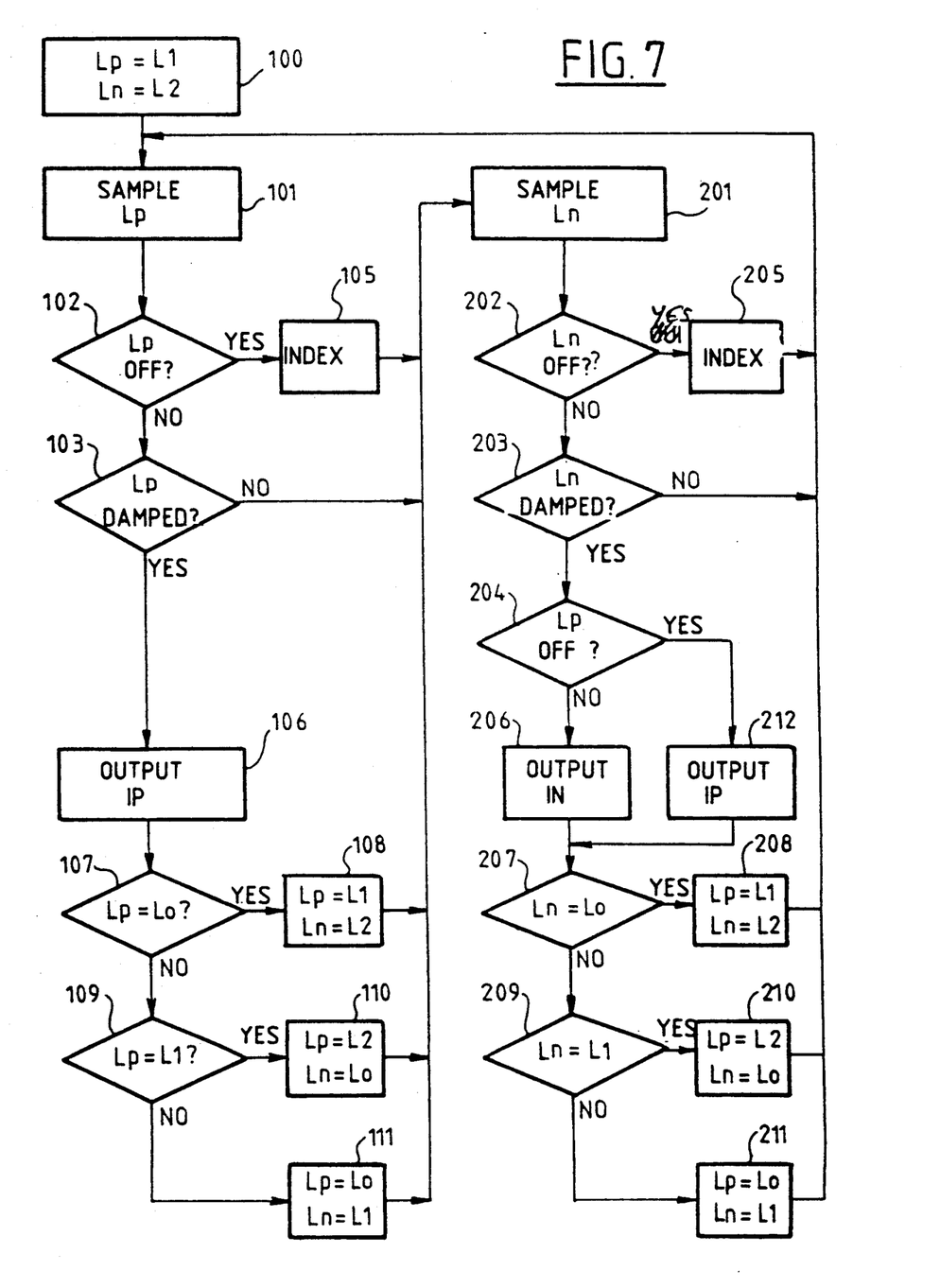
FIG. 7 is a flow chart of the logic that applies to successive sequences in the second embodiment.

The logic processing that controls the successive sequences of the three-detector device is now described with reference to FIG. 7. The processing applies to (m−1) detectors, i.e. to two detectors of indices p and n, respectively Lp and Ln.

On starting, arbitrary initial values Lp=L1 and Ln=L2 (block 100) are taken, i.e. the device starts on detectors L1 and L2.

Initially, the signal delivered by the detector Lp is sampled (block 101) and it is verified (block 102) that this detector has not been declared to be out of operation, e.g. following a detector breakdown or a deliberate choice to operate on two detectors only. If the detector Lp is out of operation, then the index or the electronic counting circuits are informed (block 105) so that the counting circuits change the weight given to each signal IP that they receive, and the system passes directly to sampling the signal delivered by the detector Ln (block 201). Otherwise, the signal delivered by the detector Lp is analyzed and verified to see whether it is damped or not (block 103), i.e. whether the mark is being detected or not. The detailed processing for analyzing the signal and identifying passage of the mark is described below with reference to FIG. 8.

If the signal delivered by the detector Lp is not damped, then the system passes directly to sampling the signal delivered by the detector Ln (block 201). Otherwise, i.e. if the mark is detected as being level with the detector Lp, the following are performed in succession:

a signal IP is applied to the electronic counting circuits 52 corresponding to ⅓ of a turn in the positive direction of rotation (block 106);

the selected detectors Lp and Ln are altered as follows:
if Lp=L0 (block 107), then Lp=L1 and Ln=L2 (block 108);
if Lp=L1 (block 109), then Lp=L2 and Ln=L0 (block 110); or
if Lp=L2, then Lp=L0 and Ln=L1 (block 111); and
finally the signal delivered by the detector Ln is sampled (block 201).

The processing applied to the signal delivered by the detector Ln is almost identical to that described above with respect to the signal delivered by the detector Lp.

The signal delivered by the detector Ln is sampled (block 201) and it is verified that this detector is not declared to be out of operation (block 202). If it is out of operation, then the index or the counting circuits are informed (block 205) so that the counting circuits modify the weight given to each signal IP received thereby such that two signals IP correspond to one rotation and the system returns directly to sampling the detector Lp. Otherwise, the signal delivered by the detector Ln is analyzed and verified to see whether it is damped or not (block 203).

If the signal delivered by the detector Ln is not damped, then the system returns to sampling the detector Lp (block 101). Otherwise, it is verified that the detector Lp has not been declared to be out of operation (block 204) and if it has been declared out of operation, then a signal IP is applied to the electronic counter circuits (block 212) given that if one of the detectors has broken down, it is no longer possible to detect the direction of rotation. Under such circumstances it is assumed that the spinner always rotates in the positive direction of rotation. If the detector Lp has not been declared to be out of operation, then a signal IN is applied to the electronic counter circuits corresponding to ⅓ of a turn in the negative direction of rotation (block 206).

After a signal IP or IN has been delivered, the detectors Lp and Ln are reselected as follows:

if Ln=L0 (block 207), then Lp=L1 and Ln=L2 (block 208);

if Ln=L1 (block 209), then Lp=L2 and Ln=L0 (block 210); and if Ln=L2, then Lp=L0 and Ln=L1 (block 211); and finally the system returns to sampling the signal delivered by the detector Lp (block 101).

Figure 8:
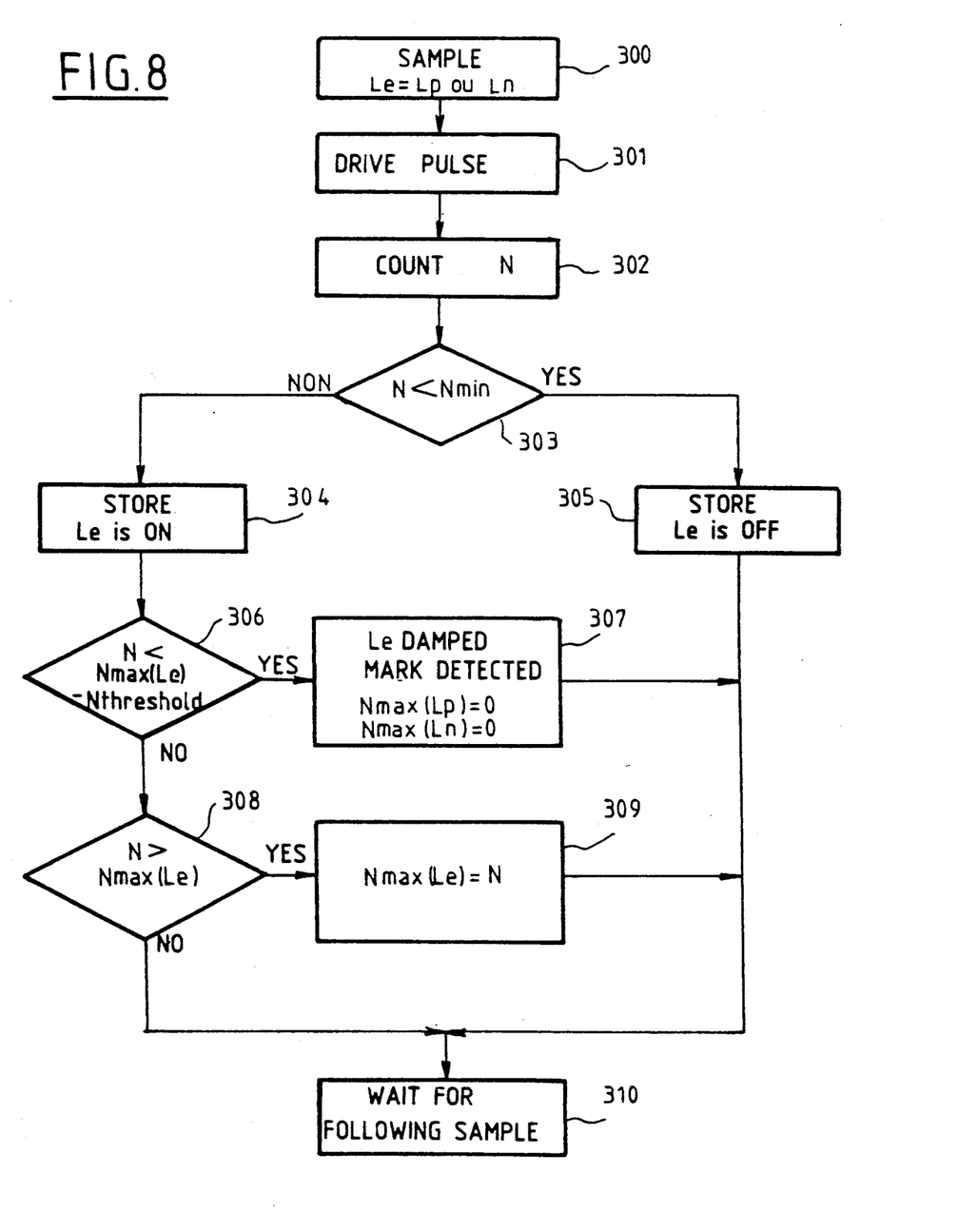
FIG. 8 is a flow chart showing the processing for analyzing changes in the signals delivered in the second embodiment of the invention.

The sampling and the processing of the signal delivered by a detector Le=Lp or Ln (block 300) to decide whether the signal is damped or not, i.e. whether the mark is being detected or not at the detector Le in question is now described with reference to FIG. 8.

Sampling takes place at a frequency of 800 Hz, which value makes it possible to measure spinner speeds of rotation in the range 0 to 40 revolutions per second. Sampling begins by applying a drive pulse of about 3 V to the detector Le (block 301) with Le=Lp or Ln.

In response to this pulse, the detector Le delivers a damped sinewave signal at a frequency of about 250 kHz. The number N of periods above a specified threshold Vthreshold, e.g. about 0.3 V (block 302), is then counted and it is verified that the detector is working by comparing the number N with a minimum value Nmin (block 303), where Nmin is representative of the minimum number of periods, below which the detector is declared to be out of operation.

If $N<Nmin$, then the fact that the detector Le is out of service is stored (block 305) to inform the sequence logic (blocks 102, 202) so as to enable the device to operate with the other two detectors only but without being able to detect the direction of rotation. The counting circuits are also informed so that each signal IP delivered to the counting circuits represents ½ of a revolution instead of ⅓ of a revolution. Thereafter the system passes directly to waiting for the following sample (block 310).

Otherwise, i.e. if $N>Nmin$, the fact that the detector is in operation is stored (block 304) and the number N is compared with a value Nmax(Le)−Nthreshold (block 306), where Nmax(Le) corresponds to the parameter calculated for the corresponding detector Le during the preceding cycle and where Nthreshold corresponds to a predetermined threshold value that is valid for all three detectors.

If $N<Nmax(Le)−Nthreshold$, then the signal delivered by the detector Le has been damped, and that corresponds to a mark going past the corresponding detector Le. Under such circumstances, the parameters are reinitialized Nmax(Ln)=Nmax(Lp)=0 (block 307) and the system waits for the following sample (block 310).

Otherwise, a test is made to see whether $N>Nmax(Le)$ (block 308); if so, the parameter Nmax(Le)−N is updated and the system waits for the following sample (block 310).

Finally, if $Nmax(Le)−Nthreshold<N<Nmax(Le)$, then the parameter Nmax(Le) is not changed and the system waits for the following sample (block 310).

I claim:

1. A device for detecting the rotation of a rotary element about an axis XX', the device comprising:
   a) m proximity detectors situated in a plane perpendicular to the axis XX' on m radial directions;
   b) a mark fixed to said element eccentrically relative to the axis XX', said mark being suitable for modifying the response of the proximity detectors when said element is rotating;
   c) a power supply for powering said proximity detectors;
   d) selection means for selecting a series of m−1 proximity detectors to be powered; and
   e) processor means firstly for observing changes in the signals delivered by each of the detectors in said series using parameters representative of such changes, thereby identifying the passage of the mark past one of the detectors situated at the end of said series, and secondly, as soon as such a passage has been identified, for:

deducing therefrom the number of revolutions;

actuating the selection means so as to cause it to select a new series of m−1 proximity detectors excluding the detector at which passage of the mark has just been identified; and reinitializing said parameters in readiness for observing changes in the forthcoming signals from said new series, in such a manner that the parameters reinitialized in this manner are representative of the fact that at that time the mark cannot be at one of the detectors of said new series.

2. A device according to claim 1, wherein:
   the rotary element is made of non-metallic material;
   the mark is constituted by a metalized portion of said rotary element;
   each proximity detector is constituted by an oscillator circuit including a coil and a capacitor; and
   the power supply means comprise a pulse generator feeding each detector in said selected series in succession.

3. A device according to claim 2, wherein the frequency of the pulse generator lies in the range 400 Hz to 800 Hz and that it delivers pulses of about 3 V.

4. A device according to claim 2, wherein the frequency of the signal delivered by said oscillating signal is about 250 kHz.

5. A device according to claim 2, wherein m=2.

6. A device according to claim 5, wherein the processor means comprise:
   for each signal delivered, means for counting the number N of periods in the signal exceeding a predetermined threshold value Vthreshold;
   for each value N obtained in this way, means for comparing N with two parameters Nmax and Nthreshold representative of the said changes and for calculating two new values of said parameters, said values of said parameters concerning said changes being calculated as follows:

if $N>Nmax$
   Nmax=N
   Nthreshold=f(Nmax) with Nthreshold<Nmax
   if $Nthreshold<N<Nmax$
   Nmax=Nmax
   Nthreshold=Nthreshold
   if $N<Nthreshold$
   Nmax=0
   Nthreshold=0 and means for generating said control signal for actuating said selection means and for incrementing an index used for counting the number of revolutions when N is less than Nthreshold.

7. A device according to claim 6, wherein the function Nthreshold=f(Nmax) is determined on the basis of minimum and maximum numbers of periods exceeding the threshold voltage when the signal is respectively strongly damped and weakly damped.

8. A device according to claim 2, wherein m=3, i.e. wherein the device comprises three detectors, with processing being applied to the signals delivered by two of the detectors Le=Lp or Ln.

9. A device according to claim 8, wherein the processor means comprise:
   for each signal delivered by a detector Le, means for counting the number N of periods that exceed a predetermined threshold voltage Vthreshold;
   for each value N obtained in this way, means for comparing N with a parameter Nmax(;=) representative of changes in the signals delivered by the detector Le, and with a fixed parameter Nthreshold which is valid for all three detectors, and for calculating new values of said parameters as follows:
   if N>Nmax
     Nmax(Le)=N
   if Nmax(Le)−Nthreshold<N<Nmax(Le)
     Nmax(Le)=Nmax(Le)
   if N<Nmax(Le)−Nthreshold
     Nmax(Lp)=0 and Nmax(Ln)=0
   when N<Nmax(Le)−Nthreshold, means for applying a signal IP or IN to the counter circuits as a function of whether the detector Le=Lp or Ln, the signals IP and IN being respectively representative of one-third of a revolution in the positive direction of rotation and in the negative direction of rotation, and for selecting two new detectors.

10. A device according to claim 9, wherein the processor means further include:
   means for ensuring that each detector is operating properly by comparing the number N with a value Nmin; and
   if one of the detectors should break down, means enabling the device to continue to operate using the other two detectors.

11. A device according to claim 1, wherein the rotary element is constituted by a disk fixed to the spinner of a water meter.

* * * * *